US009361432B2

(12) United States Patent
Deter et al.

(10) Patent No.: US 9,361,432 B2
(45) Date of Patent: Jun. 7, 2016

(54) CONFIGURING A SECURITY SETTING FOR A SET OF DEVICES USING A SECURITY POLICY

(71) Applicant: Hewlett-Packard Development Company, L.P., Houston, TX (US)

(72) Inventors: Matthew Deter, Rocklin, CA (US); Kimberly Drongesen, Granite Bay, CA (US); John Bigley, Auburn, CA (US); Jay Schudel, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 14/155,768

(22) Filed: Jan. 15, 2014

(65) Prior Publication Data

US 2015/0199496 A1    Jul. 16, 2015

(51) Int. Cl.
*G06F 21/00*     (2013.01)
*H04L 29/06*     (2006.01)

(52) U.S. Cl.
CPC ............... *G06F 21/00* (2013.01); *H04L 63/20* (2013.01)

(58) Field of Classification Search
CPC ......... H04L 63/20; H04L 63/08; H04L 63/10; H04L 63/0815; G06F 21/6218
See application file for complete search history.

(56) References Cited

U.S. PATENT DOCUMENTS

| 5,720,012 A | 2/1998 | McVeigh et al. |
| 6,484,261 B1 | 11/2002 | Wiegel |
| 6,678,827 B1 | 1/2004 | Rothermel et al. |
| 7,143,210 B2 | 11/2006 | Ferlitsch |
| 7,581,241 B2 | 8/2009 | Bassett et al. |
| 7,869,071 B2 | 1/2011 | Liu |
| 8,056,124 B2 | 11/2011 | Bassett et al. |
| 8,056,140 B2 | 11/2011 | Fukuta |
| 8,117,461 B2 | 2/2012 | Bigelow, Jr. et al. |
| 8,588,111 B1 * | 11/2013 | Kridlo ............... H04M 3/42221 370/259 |
| 8,621,565 B2 * | 12/2013 | Ohta ..................... G06F 21/604 713/168 |
| 8,707,439 B2 * | 4/2014 | Holostov .............. G06F 21/577 705/7.28 |
| 8,793,758 B2 * | 7/2014 | Raleigh ................... G06F 21/57 455/414.1 |
| 8,806,574 B2 * | 8/2014 | Manjunath ............ G06F 21/629 726/1 |

(Continued)

FOREIGN PATENT DOCUMENTS

JP        2012053510 A       3/2012

OTHER PUBLICATIONS

Anderson, P. et al., "SmartFrog meets LCFG: Autonomous Reconfiguration with Central Policy Control," Proceedings of the 17th Large Installation Systems Administration Conference, Oct. 2003 <http://static.usenix.org/events/lisa2003/tech/full_papers/anderson/anderson_html/>.

(Continued)

*Primary Examiner* — Yonas Bayou
(74) *Attorney, Agent, or Firm* — Mahamedi Paradice LLP

(57) ABSTRACT

A system and method for configuring security settings for devices is described. The system determines a security policy to regulate the use of a set of devices, including a first device and a second device. Support information for the first device and the second device can be determined. The security policy is implemented on each of the first device and the second device by selecting, based on the respective support information, a first security mechanism for the first device and a different second security mechanism for the second device, and configuring the first device with the first security mechanism and the second device with the second security mechanism.

20 Claims, 4 Drawing Sheets

(56) References Cited

U.S. PATENT DOCUMENTS

| | | | | |
|---|---|---|---|---|
| 8,881,223 | B2* | 11/2014 | Hudis | G06F 17/30867 |
| | | | | 709/225 |
| 8,966,574 | B2* | 2/2015 | Kiehtreiber | H04L 63/20 |
| | | | | 726/1 |
| 9,189,636 | B2* | 11/2015 | Deter | G06F 21/45 |
| 2005/0102442 | A1 | 5/2005 | Ferlitsch | |
| 2008/0007760 | A1 | 1/2008 | Kimura | |
| 2008/0062454 | A1 | 3/2008 | Bostick et al. | |
| 2008/0252910 | A1 | 10/2008 | Cordesses et al. | |
| 2009/0007224 | A1 | 1/2009 | Aso et al. | |
| 2009/0144803 | A1* | 6/2009 | Schreiber | G06F 21/6218 |
| | | | | 726/1 |
| 2010/0043052 | A1* | 2/2010 | Park | G06F 21/305 |
| | | | | 726/1 |
| 2010/0115577 | A1* | 5/2010 | Ratnala | G06F 21/604 |
| | | | | 726/1 |
| 2011/0191817 | A1* | 8/2011 | Oh | G06F 21/608 |
| | | | | 726/1 |
| 2011/0242569 | A1 | 10/2011 | Ohara | |
| 2013/0016388 | A1 | 1/2013 | Amano | |
| 2013/0074147 | A1* | 3/2013 | LaVigne | H04L 47/10 |
| | | | | 726/1 |
| 2014/0029039 | A1 | 1/2014 | Deter et al. | |

OTHER PUBLICATIONS

Hewlett-Packard Development Company, L.P., HP Web Jetadmin software, (Web page), Mar. 23, 2009, <http://web.archive.org/web/20090323120856/http://www.hp.com/united-states/web-jetadmin/with-hp.html>.

Ricoh, "HP Web Jetadmin Briefing Paper," Nov. 2005, 4 pages.

Cisco Systems, Introduction [Cisco PIX Firewall Software], (Web Page) retrieved on Dec. 19, 2013 at http://www.cisco.com/en/US/docs/security/pix/pix42/configuration/guide/.

Closing the Print Security Gap, (Research Paper), Oct. 2011.

* cited by examiner

CONFIGURING A SECURITY SETTING FOR A SET OF DEVICES USING A SECURITY POLICY

BACKGROUND

A user or a customer, such as a business, can own or have control over plurality of different devices having different capabilities. Securing these devices can be difficult and time-consuming as a user must manually configure the security settings for individual devices. For example, in some cases, the user may be required to create multiple policies for different devices based on specific capabilities.

DETAILED DESCRIPTION

Figure 1:
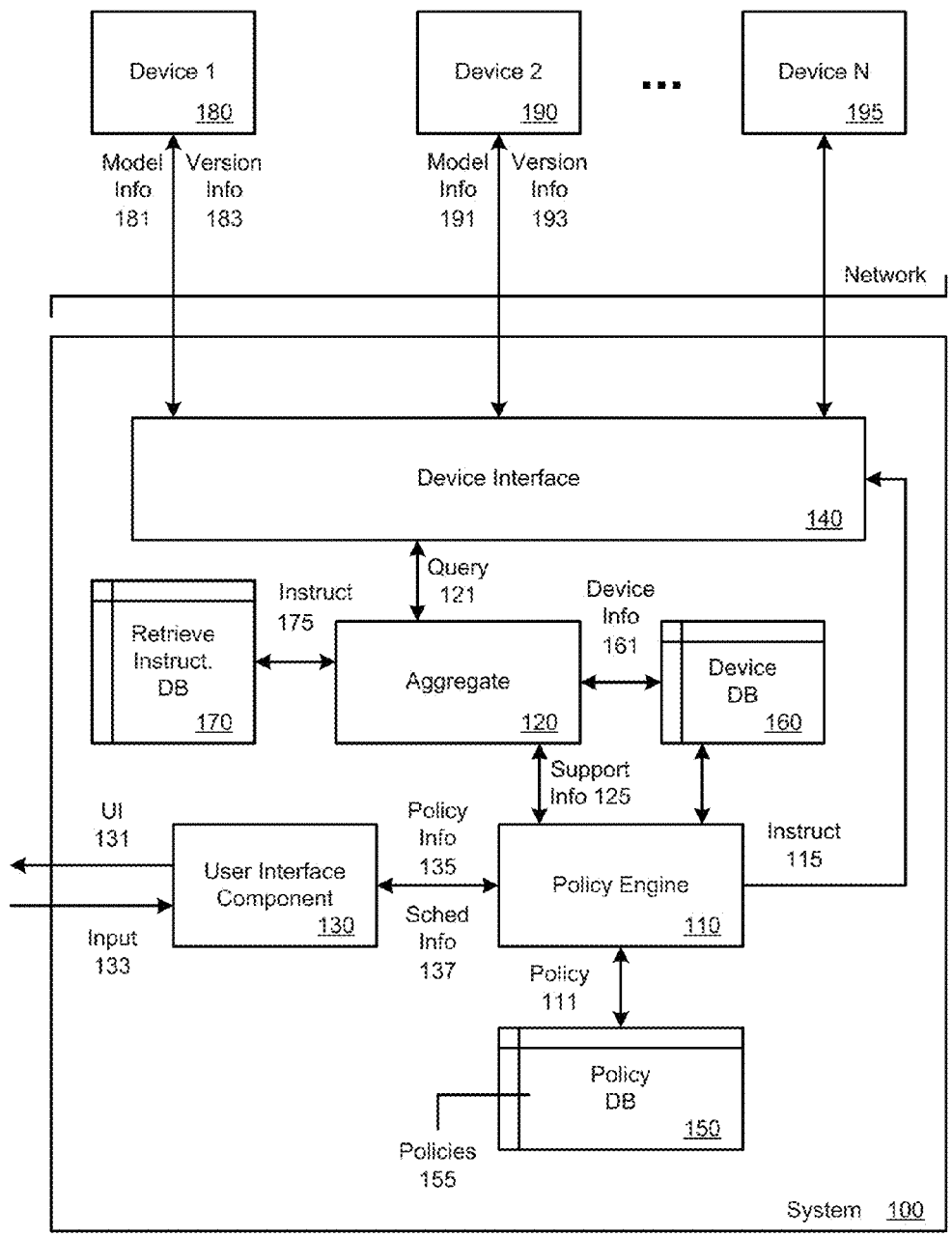
FIG. 1 illustrates an example system to configure security settings for a set of devices.

Examples described herein provide for a device management system that can determine a security policy for regulating use of a set of devices, and can implement the security policy to cause different devices to use different security mechanisms. In this manner, for example, the system can use a single, common security policy to configure heterogeneous devices (e.g., devices of different types, models, etc.) without having a user individually configure each of the devices or create a different policy for each of the devices.

In one example, the system can determine a security policy that regulates use of a set of devices, where the set of devices includes at least a first device and a second device that are different from each other (e.g., the devices are different types of devices, different models, or have different version software installed on the devices, etc.). These devices can correspond to devices that a user or organization ("customer") has control or ownership over and that can each communicate with the system over one or more networks. The system determines support information for the devices that indicate what features, software, hardware, etc. that each device has and/or is capable of supporting. The security policy is implemented on each of the first device and the second device by selecting, based on the respective support information of the devices, a first security mechanism for the first device and a different second security mechanism for the second device, and configuring the first device with the first security mechanism and the second device with the second security mechanism.

According to an example, a user can configure the security policy by interacting with a user interface provided by the system. The system can present a user interface on a display device accessible by the user and enable the user to configure a policy by selecting one of a plurality of options corresponding to a particular security setting. For example, the user interface can provide a security setting corresponding to a security mechanism (e.g., an encryption algorithm) that devices are to use and enable the user to select from a plurality of different security mechanisms. The options can include at least a first security mechanism option, a second security mechanism option, and a "best possible" security mechanism option. When the "best possible" option is selected for the security policy, the system can implement the policy by automatically selecting an appropriate security mechanism for each of the devices based on respective support information of the devices and configure each of the devices with the appropriate security mechanism.

In one example, the system can determine support information for the devices by first determining the model information of the devices and the version information of firmware or software installed on the devices. Depending on implementation, the system can query or request this information from the devices and/or retrieve this information from a database maintained by the system. Based on the model information and/or the version information of the devices, the system can use predefined instructions or techniques to determine which portion or field of a device's resource to access in order to retrieve the support information related to a security setting.

Although examples described are in reference to security and security mechanisms, other settings can be configured for devices using a single, common policy. Other types of settings can include, for example, settings for different authentication processes, settings for device discovery, settings for file sharing, print settings, virus checking settings, etc. For example, for a particular type of settings (e.g., print settings), the system can implement a single policy for a set of devices by selecting an appropriate setting for individual devices based on support information (e.g., related to print settings) of the set of devices and by configuring each of the set of devices with the appropriate setting. In this manner, a customer can configure a plurality of heterogeneous devices using a single policy.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to configure security settings for a set of devices. According to some examples, the system can determine a policy that regulates use of the set of heterogeneous devices and implement the policy on each of the set of heterogeneous devices so that different settings can be configured on different devices. This enables a single policy to be used for configuring multiple devices (that can have different capabilities or support different features) with the best possible settings while accounting for specific capabilities/features available on each of the devices.

In one example, system 100 includes a policy engine 110, an aggregate 120, a user interface component 130, a device interface 140, and a plurality of databases. The databases can include at least a policy database 150 that stores a plurality of policies 155, a device database 160 that stores device information 161 about different devices that are connected to system 100 via one or more networks, and a retrieve instruction database 170 that stores predefined instructions 175 or techniques used by system 100 to determine or retrieve support information for the devices. The components of system 100 can combine to determine a security policy for a set of devices, determine support information for the devices, and implement the security policy on each of the devices. Logic can be implemented with various applications (e.g., software) and/or with firmware or hardware of a computer system that implements system 100.

Depending on implementation, one or more components of system 100 can be implemented on a computing device, such as a server, laptop, PC, etc., or on multiple computing devices that can communicate with a fleet or set of devices over one or more networks. In some examples, a computing device can operate or execute an application, such as a device management program, to perform one or more of the processes described by the various components of system 100. System 100 can also be implemented through other computer systems in alternative architectures (e.g., peer-to-peer networks, etc.).

System 100 can communicate, over one or more networks via a network interface (e.g., wirelessly or using a wireline), with a set of devices, such as device 180, device 190, device 195, etc., using a device interface 140. The device interface 140 can enable and manage communications between system 100 and each of the set of devices. Depending on implementation, the devices 180, 190, 195 can correspond to devices in a fleet of devices, such as a fleet of printer devices (e.g., printers, multifunction printers, scanners, etc.), that is controlled or owned by a customer that operates system 100. A printer device can be a device that makes a representation of text or graphics on physical media. For example, the customer can correspond to an individual or a business that operates a plurality of devices (e.g., five, ten, one hundred, etc., printer devices). System 100 enables the customer to configure the security settings of the devices 180, 190, 195 by using a single, common security policy.

According to some examples, the policy engine 110 can manage the policies 155 of system 100, including a security policy 111, and implement one or more policies 155 on the set of devices 180, 190, 195. The policy engine 110 can access the policy database 150, which stores a plurality of policies 155 for system 100. The policies 155 can specify parameters, permissions, conditions, and/or rules that specify or regulate the use of one or more devices 180, 190, 195. For example, the policies 155 can specify various configurations for the devices, such as security mechanisms, authentication, password settings, file sharing, virus checking, print settings, device discovery, user settings, etc. for any of one or more devices 180, 190, 195. Depending on implementation, a policy 155 can be implemented on a single device, multiple devices, or all of the devices in a fleet of devices.

The policy engine 110 can communicate with and work in conjunction with the user interface component 130. The user interface component 130 can provide user interfaces, such as a user interface 131, to be displayed on a display device. In one example, the user interface 131 can provide a mechanism to enable a user to create, view, edit, and/or delete policies 155 for system 100 via one or more user inputs 133. The user interface 131 can include features for selecting options for configuring a single policy 111 that can cause different settings or parameters to be configured for different types of devices. For example, the user interface 131 can correspond to a policy editor and include selection features to enable a user to select one of a plurality of different security mechanisms or mechanisms for a set of devices. A user can interact with the user interface 131 to create or edit a policy 111 with policy information 135 specified by the user input 133. The policy 111 can be stored in the policy database 150 to regulate the use of the devices 180, 190, 195.

For example, a user can interact with the user interface 131 to create or edit a security policy 111. The policy 111 can specify configuration settings, such as a security mechanism or encryption algorithm that is to be used by the devices 180, 190, 195 in communication with system 100. The user can interact with, for example, a selection feature that provides a plurality of security mechanism options that are to be used by the devices 180, 190, 195. Because the devices 180, 190, 195 can be heterogeneous, e.g., can have different capabilities or support different features, such as different security mechanisms, not all the devices 180, 190, 195 can support the same security mechanism. For example, a first device 180 can support a first algorithm or mechanism, such as an MD5 algorithm, but not a second, newer algorithm or mechanism, such as a SHA-1 algorithm. On the other hand, a second device 190 can be a newer device model or have newer version firmware or software so that it can support both the first algorithm and the second algorithm. Instead of having the user determine the different device functionalities and/or support information, and then create a first security policy for the first device 180 and a second security policy for the second device 190, system 100 can enable the user can configure a single, common security policy 111 by selecting an option, such as a "Best Possible" security mechanism option, on the user interface 131. The security policy 111 can be stored in the policy database 150 with the specified "Best Possible" security mechanism option.

The policy engine 110 can be instructed to assess the status of the devices 180, 190, 195 and implement one or more policies manually (e.g., based on user input instructing the policy engine 110) or automatically (e.g., based on a configured schedule). In one example, the user interface component 130 can provide a user interface that provides a mechanism to enable the user to provide scheduling information 137 for controlling when the policy engine 110 is to assess the devices and implement one or more policies. For example, the scheduling information 137 can specify that the policy engine 110 assess the configuration status of the devices and implement the policy 111 every day, every week, every hour, etc.

According to some examples, the policy engine 110 can assess the devices to (i) determine what security mechanism(s) the devices can support and/or to determine the current configuration status or state of the devices, such as what security algorithm that devices are currently using, and (ii) determine whether the configuration of the devices need to be changed based on the support or status information and the policy settings of a particular policy, such as the security policy 111. The policy engine 110 can compare, for each device, the policy information with the support or status information to determine whether that device is complying with the policy or not. The policy engine 110 can then perform an implementation or remediation process to configure the devices accordingly.

When the policy engine 110 is instructed or triggered to assess the devices and implement one or more policies, such as the security policy 111, the "Best Possible" security mechanism option of the policy 111 can cause the policy engine 110 to programmatically select the best security mechanism for each of the devices 180, 190, 195 and configure the individual devices 180, 190, 195 with the selected security mechanism. According to some examples, the policy engine 110 can determine what security mechanism is "best" for a device based on one or more rules or predefined settings (e.g., configurable by a user). The "best" security mechanism can be a selected security mechanism suited for individual devices based on the individual devices' support information. For example, the "best" security mechanism for a device can be the most recent encryption algorithm that the device is capable of supporting and/or the most secure encryption algorithm from a plurality of different encryption algorithms that the device is capable of supporting.

The policy engine 110 can access the device database 160, which includes device information, to identify the devices 180, 190, 195 (e.g., devices in a fleet of devices that are operated by a customer or user of system 100) that need to be configured with the policy 111. Referring to the example discussed, the policy engine 110 can determine that the first device 180 can support the first algorithm (e.g., MD5 algorithm) but not the second algorithm (e.g., SHA-1 algorithm). The policy engine 110 can identify the first algorithm as being the "best" algorithm for the first device (because it is the most recent and/or more secure algorithm the first device is capable of supporting), and implement the policy 111 so that the first device 180 is configured to use the first algorithm. Similarly, the policy engine 110 can determine that the second device 190 can support both the first and second algorithms, but determine that the second algorithm is the newer and/or more secure algorithm than the first algorithm. The policy engine 110 can identify the second algorithm as being the "best" algorithm for the second device, and can implement the policy 111 so that the second device 190 is configured to use the second algorithm. In this manner, a single policy 111 can be used to configure the security settings for individual devices with the most recent or most secure security mechanisms that those devices can support and use.

The policy engine 110 can determine and select which security mechanism each device 180, 190, 195 is to be configured to use based on support information for the respective devices 180, 190, 195. In some examples, the support information can refer to information that indicates what features, software, hardware, etc., each device has and/or is capable of supporting, including what security mechanism the device can use for security purposes. When the policy engine 110 is instructed or triggered to assess the status of the devices in order to implement the security policy 111, the policy engine 110 can determine support information 125 for the devices. Depending on implementation, the policy engine 110 can receive the support information 125 from the aggregate 120 and/or retrieve the support information 125 from the device database 160.

According to some examples, the aggregate 120 can determine device information 161 and support information 125 about the devices 180, 190, 195 that are in communication with system 100. In one example, the aggregate 120 can access the device database 160, which includes device information about the set of devices that are in control or operated by the customer. For example, the devices 180, 190, 195 can correspond to network-enabled printers for a user or a particular business. The device database 160 can include, for each network-enabled printer, a manufacturer identifier, a model, a model number, a webpage, serial number, MAC address, printer identifier, an IP address, status information, hardware information, etc. As an addition or an alternative, the aggregate 120 can send a request or query 121 to the devices 180, 190, 195 for device information via the device interface 140. The devices, such as the first device 180 and the second device 190, can respond to the query 121 and provide the respective model information 181, 191, and software and/or firmware version information 183, 193 to the aggregate 120 via the device interface 140. In this manner, the aggregate 120 can maintain and update the device database 160 with the appropriate and up-to-date device information 161 when devices update their software and capabilities.

The aggregate 120 can also access the retrieve instructions database 170. The retrieve instructions database 170 can include a plurality of instructions 175 or predefined techniques that specify where support information 125 for a particular device or device type can be found. Depending on implementation, the instructions 175 can be preconfigured and/or periodically and dynamically updated with the addition of new devices, device types, and/or software versions. The aggregate 120 can access the retrieve instructions database 170 to determine respective instructions 175 that direct the aggregate 120 to the appropriate resource and/or specific portions or locations of the resource to determine support information 125 for a device.

For example, based on the device information 161 for a particular device, such as the first device 180, the aggregate 120 can identify the appropriate instructions 175 from the retrieve instructions database 170. The first device 180 can correspond to a laser printer device type, for example, made by Manufacturer A, having a model number B, and having software version C. The aggregate 120 can access the retrieve instructions database 170 for a device having the same or similar characteristics, and determine instructions 175 for that device or device time. The instructions 175 can direct the aggregate 120 to access a specific resource for that device, such as a particular webpage corresponding to that device (e.g., via a link), access a particular portion of the webpage, search for a particular field or name of the field, search for a particular term or value, etc., in order to determine the support information 125 for that device. According to an example, one or more of the set of devices can support Simple Network Management Protocol (SNMP). The device(s) can operate an agent and implement an SNMP interface that enables system 100 to receive or retrieve information about the device(s) via SNMP.

In some examples, the aggregate 120 can also store the determined support information 125 for the respective devices in the device database 160. In this manner, the instructions 175 can guide the aggregate 120 to quickly search the relevant portions of the resource in order to determine what features the devices 180, 190, 195 are capable of supporting, including what security mechanism the devices can use for security purposes.

Referring back to the previous example, the aggregate 120 can access the resources of the first device 180 and the second device 190, such as the respective webpage of the devices, and look up the appropriate portions of the respective webpage of the devices to determine the support information 125 of the devices, such as what security mechanism the first device 180 and the second device 190 support. The aggregate 120 can determine that the first device 180 supports the first encryption algorithm (e.g., MD5 algorithm) but not the second encryption algorithm (e.g., SHA-1 algorithm) and that the second device 190 can support both the first and second encryption algorithms. The policy engine 110 can receive the support information 125 from the aggregate 120 and/or from the device database 160, and implement the policy 111 by using the support information 125 to select which security algorithms should be used by the first device 180 and the second device 190.

In one example, the policy engine 110 can compare the support information 125 with the security policy 111 (e.g., which specified the "Best Possible" security mechanism option) and determine that the best security mechanism for the first device 180 is the first algorithm and that the best security mechanism for the second device 190 is the second algorithm. The policy engine 110 can determine the current encryption status for the devices, can determine that a change to the security mechanism settings is needed or not, and can provide configuration or update instructions 115 to the respective devices via the device interface 140. The configuration instructions 115 can cause the first device 180 and the second device 190 to be configured appropriately. For example, the second device 190 can be currently using the first algorithm. Because the security policy 111 specifies that the best or most recent or more secure algorithm is to be used, the policy engine 110 can configure the second device 190 to use the more secure algorithm, e.g., the second encryption algorithm.

In this manner, system 100 enables a single, common policy to be used to configure the security settings of multiple, heterogeneous devices. The policy can specify a particular security setting, such as the "Best Possible" security mechanism, that can cause system 100 to automatically determine respective support information for the devices and use that information to selectively configure the devices with the appropriate security mechanisms for those devices.

Methodology

Figure 2:
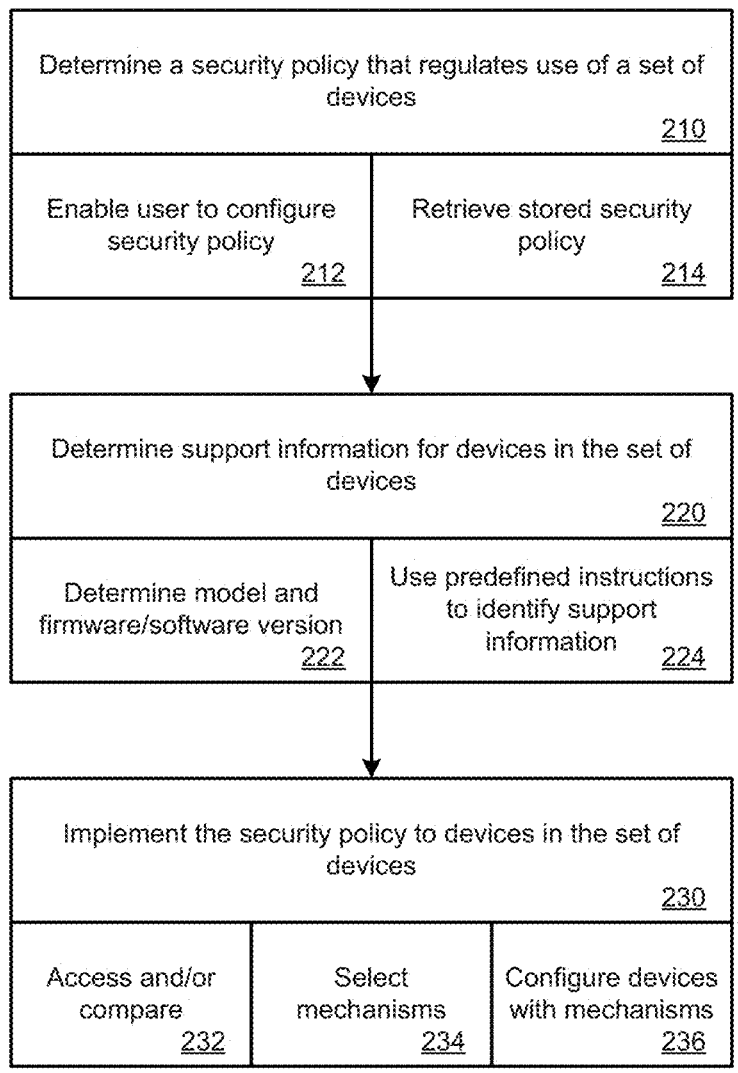
FIG. 2 illustrates an example method for configuring security settings for a set of devices.

FIG. 2 illustrates an example method for configuring security settings for a set of devices. A method such as described by an example of FIG. 2 can be implemented using, for example, components described with an example of FIG. 1. Accordingly, references made to elements of FIG. 1 are for purposes of illustrating a suitable element or component for performing a step or sub-step being described.

Referring to FIG. 2, system 100 can determine a security policy 111 that regulates use of a set of devices, such as a fleet of devices of a user or customer (210). System 100 can determine the security policy 111 in response to being instructed to configure the set of devices with the security policy 111 (e.g., by a user) or in response to being triggered to configure the set of devices with the security policy 111 based on a predetermined (e.g., user configured) schedule. The security policy 111 can specify parameters, permissions, conditions, and/or rules that specify or regulate the use of the devices, including a first device and a second device that have different capabilities or support different features. In one example, the security policy 111 can specify a particular security mechanism or encryption algorithm that the devices are to use.

In one example, system 100 can provide a user interface, such as an interface corresponding to a policy creator or editor of an application, that enables a user to create, edit, and/or delete a security policy (212). The user can interact with the user interface to configure the security policy 111. According to some examples, the user interface can provide a plurality of options for different configuration settings, such as options for a security setting, and can receive an input for selecting one or more options. The security setting, for example, can correspond to a security mechanism used by the devices, such as an encryption algorithm. One of the options that can be selected for the security policy 111 can correspond to a "Best Possible" encryption algorithm. The security policy 111 can also be stored in a policy database 150 and can be retrieved by the policy engine 110 of system 100 when system 100 is instructed or triggered to configure the set of devices with the security policy 111 to the devices (214).

The policy engine 110 can determine the settings designated by the security policy 111 for controlling or regulating the use of the set of devices. In response to determining that the "Best Possible" encryption algorithm has been designated (as opposed to a first encryption algorithm or a second encryption algorithm) for the security mechanism configuration, the policy engine 110 can determine support information for the set of devices (220). For example, the policy engine 110 can determine the support information for each of the first device and the second device. Because devices in the set of devices can have different capabilities and can support different features, the policy engine 110 can use the support information of the devices in order to determine which encryption algorithm to select for individual devices in the set of devices.

In one example, the aggregate 120 of system 100 can determine the model information of the individual devices as well as firmware or software version information for the individual devices (222). Depending on implementation, the aggregate 120 can access a device database 160 to determine such device information and/or query the devices to receive the model information and most recent, up-to-date firmware or software version information. The aggregate 120 can also update the device database 160 with the received information. Based on the model information and/or the version information for the individual devices, the aggregate 120 can also access a retrieve instructions database 170 to determine the relevant instruction(s) for the respective device (224).

According to some examples, the predefined instructions can correspond to techniques that instruct or guide the aggregate 120 to a resource of a device and locations (e.g., page, regions, portions, fields) of the resource to determine the support information for that device. For example, the retrieve instructions database 170 can include entries corresponding to different models and/or firmware or software version information that specify where relevant support information for devices having such characteristics (e.g., devices similar models or similar version information) can be found. The aggregate 120 can access the resource for a device, such as a webpage for a network-enabled printer, and based on the instructions, can specifically access certain fields or portions of the resource to determine the support information for that device (e.g., determine which security mechanism(s) the device is capable of using). In one example, the aggregate 120 can update the determined support information in a support information database for the devices or in the device database 160 of system 100, and access the database to determine support information at a subsequent time.

Using the support information for the devices, the policy engine 110 can implement the security policy 111 on each of the devices (230). In one example, the policy engine 110 can access the security configuration (and other statuses) of each device and compare that security state with the security policy 111 (232). The security state for a device, for example, can correspond to what security mechanism that device is currently using. Because the security policy 111 designates the "Best Possible" security mechanism to be used on the individual devices, the policy engine 110 can select, for each of the devices, the most recent or most secure security mechanism for that device (234). For example, the policy engine 110 does not want to select a security mechanism or encryption algorithm that a device is not allowed to use or does not support, but wants to select an encryption algorithm that the device can use and that also provides the best security for that device (e.g., the most recent or most secure as compared to other algorithms).

The policy engine 110 can configure the devices with the selected security mechanism (236). For example, based on the comparison of the security mechanism a device is currently using and the selected security mechanism that the device should be using, the policy engine 110 can determine whether the security mechanism should be changed for that device. If a first device is currently using the MD5 algorithm, but should be using the SHA-1 algorithm, the policy engine 110 can configure the first device to use the SHA-1 algorithm. On the other hand, if a second device is currently using the MD5 algorithm and the policy engine 110 determined that the second device should continue to use the MD5 algorithm, the policy engine 110 does not change the configuration of the second device and no update or configuration instruction is sent to the second device. In another example, the policy engine 110 can select (without determining the current security mechanism status information of the devices) the most recent or most secure security mechanism that each device can support or should be using. The policy engine 110 can then configure each device by sending an instruction to each device indicating that the device should be using the respective selected security mechanism.

User Interface

Figure 3:
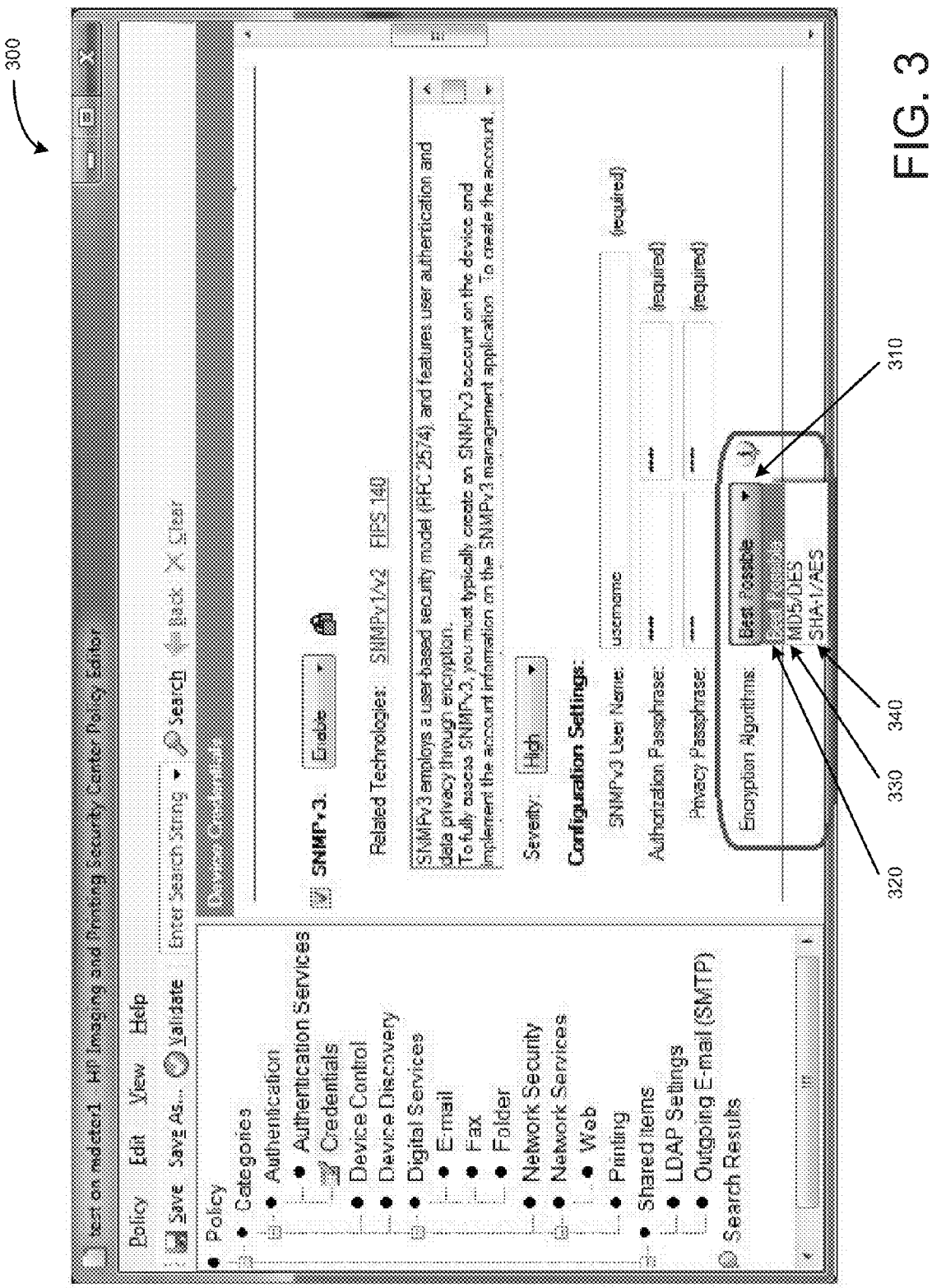
FIG. 3 illustrates an example user interface for configuring a security policy.

FIG. 3 illustrates an example user interface for configuring a security policy. The user interface 300, such as described by an example of FIG. 3 can be provided using, for example, components described with an example of FIG. 1. In one example, the user interface 300 can correspond to a policy editor that enables a user or customer to create, edit, manage, and/or delete a policy, such as a security policy that regulates the use of a set of devices in control by the user.

The user interface 300 can include options for configuring a security policy, such as a security policy 111 shown in FIG. 1. The user interface 300 can include a first portion (e.g., a left portion) showing the different policy parameters that can be configured by the user. The first portion can be arranged in a tree format showing a hierarchy of different parameters for the security policy 111 (e.g., authentication, device control, device discovery, digital services, network security, network services, shared items, etc.). A second portion of the user interface 300 can present options for the different parameters that can be configured by the user for the security policy 111.

According to one example, the security policy 111 can include configuration settings that regulate how the set of devices are to operate with respect to authentication or security. For example, the configuration or security setting can correspond to an encryption algorithm that the set of devices are to use. The user interface 300 can provide, for example, a drop down menu 310 (or other selection mechanism) that includes a plurality of options that are selectable by the user. The drop down menu 310 for configuring the encryption algorithm that the devices are to use can include a first encryption algorithm option 330 (e.g., MD5), a second encryption algorithm option 340 (SHA-1), and a third option 320 specifying that the "Best Possible" algorithm is to be used for individual devices. Although only three encryption algorithm options are shown in the example of FIG. 3, in some examples, additional algorithm options can be included in the drop down menu 310 (e.g., four or more). The user can configure the security policy 111 by providing inputs on the user interface 300.

For example, if the user selects the first encryption algorithm option 330 for the security policy 111 (e.g., MD5), the policy engine can configure each of the devices to use the MD5 algorithm. However, in such a case, devices that can support a more recent and more secure algorithm, such as the SHA-1 algorithm, will not be configured to use the more recent and more secure algorithm. Accordingly, the user can instead select the third option 320 for the security policy 111 so that the "Best Possible" algorithm should be configured for the devices. The policy engine can access the security policy 111, determine that the "Best Possible" algorithm has been selected, determine the support information for the devices, and implement the security policy on the devices by selecting the appropriate security algorithm for the individual devices and configuring the devices respectively. In this manner, the device management system can implement a single, common security policy to cause different security mechanisms to be configured for different devices.

Hardware Diagram

Figure 4:
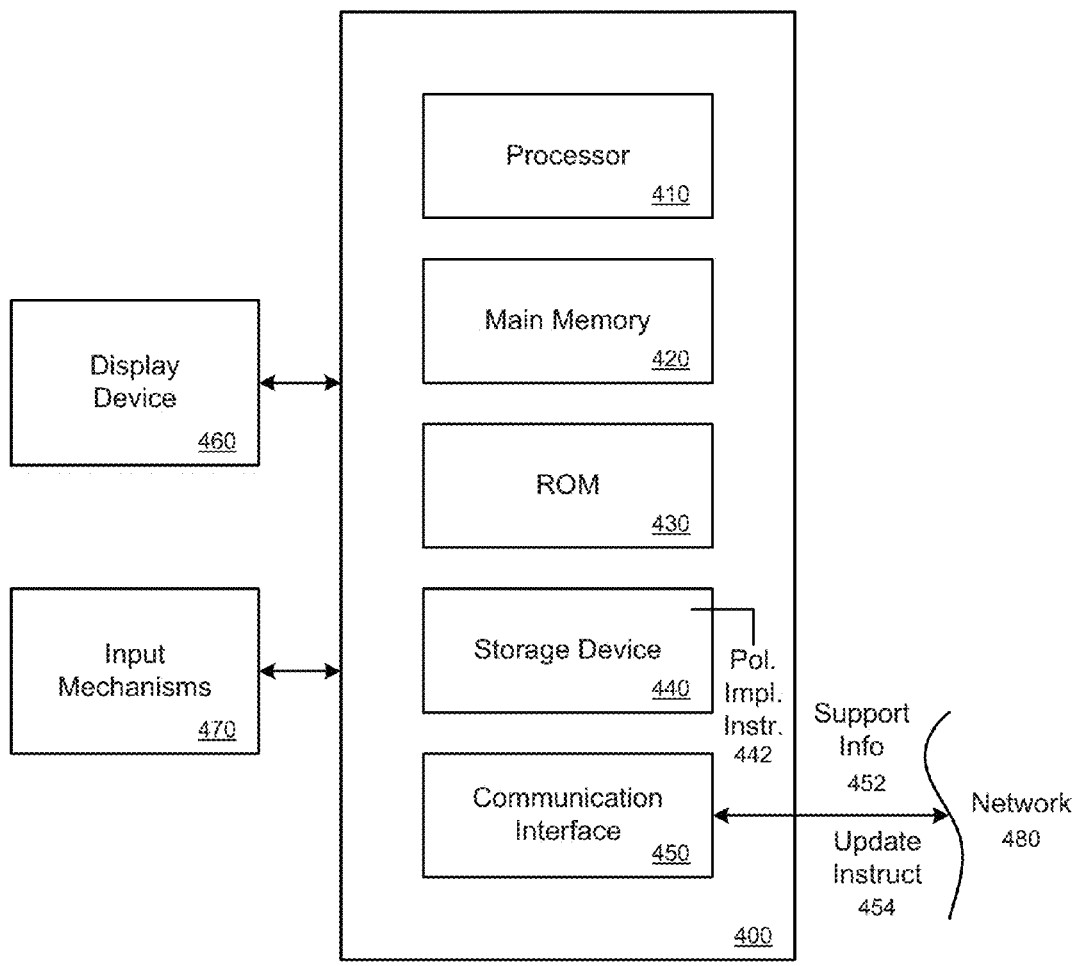
FIG. 4 is a block diagram that illustrates a computer system upon which examples described herein may be implemented.

FIG. 4 is a block diagram that illustrates a computer system upon which examples described herein may be implemented. For example, in the context of FIG. 1, system 100 may be implemented using a computer system such as described by FIG. 4. System 100 may also be implemented using a combination of multiple computer systems as described by FIG. 4.

In one implementation, computer system 400 includes processing resources 410, main memory 420, ROM 430, storage device 440, and communication interface 450. Computer system 400 includes at least one processor 410 for processing information and a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a magnetic disk or optical disk, is provided for storing information and instructions. For example, the storage device 440 can correspond to a computer-readable medium that stores policy implementation instructions 442 that, when executed by processor 410, may cause system 400 to perform operations described below and/or described above with respect to FIGS. 1 through 3 (e.g., operations of system 100 described above).

The communication interface 450 can enable computer system 400 to communicate with one or more networks 480 (e.g., computer network, cellular network, etc.) through use of the network link (wireless or wireline). Using the network link, computer system 400 can communicate with a plurality of devices, such as a fleet of printers of a user or a customer. In some variations, computer system 400 can receive support information 452 from the devices via the network link. When a security policy for a set of devices are to be implemented, the processor 410 can use the support information 452 of the devices to determine which security mechanism to use for respective devices. Once the processor 410 determines the appropriate (e.g., best possible) security mechanism for the devices, the processor 410 can transmit, over the network 480, an update instruction 454 to configure the devices with the respective security mechanisms. In this manner, computer system 400 can use a single, common security policy to cause different devices to use different security mechanisms based on the respective support information 452.

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one example, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for configuring a set of devices, the method being performed by a processor and comprising:
   providing a user interface to enable a user to specify input for selecting at least one security option for a first device in the set;
   determining at least one capability for each device in the set, the at least one capability of the first device being different than the at least one capability of a second device in the set; and
   implementing a security policy on each device in the set by (i) selecting a security setting for each device in the set based on the at least one capability that is determined for the device and the user input, the selected security setting specifying, a first security mechanism for the first device and a different second security mechanism for the second device, and (ii) configuring each device in the set to accommodate the security setting selected for that device, including configuring the first device with the first security mechanism and the second device with the second security mechanism.

2. The method of claim 1, wherein providing the user interface includes presenting, on a display device, a plurality of options, including the at least one security option, wherein the plurality of options includes a first option for designating the first security mechanism, a second option for designating the second security mechanism, and a third option for designating a selected security mechanism suited for individual devices.

3. The method of claim 2, wherein providing the user interface includes receiving user input of a selection of the third option for designating the security mechanism suited for individual devices.

4. The method of claim 1, wherein determining at least one capability for each device in the set includes (i) determining a model of each of the first device and the second device, and (ii) determining a version information of firmware installed on each of the first device and the second device.

5. The method of claim 4, wherein determining at least one capability for each device in the set includes (i) determining, for each of the first device and the second device, which portion or field of a resource to access based on the model and a version information of that device, and (ii) retrieving, for each of the first device and the second device, support information from the portion or field of that resource.

6. The method of claim 5, wherein the resource corresponds to a webpage.

7. The method of claim 1, wherein each device in the set corresponds to network-enabled printer devices, and wherein implementing the security policy on each of the first device and the second device includes communicating with the first device and the second device over a network.

8. The method of claim 1, further comprising periodically determining the security policy based on a preconfigured schedule.

9. A non-transitory computer-readable medium storing instructions that, when executed by a processor, cause the processor to perform operations comprising:
   providing a user interface to enable a user to specify input for selecting at least a security option for a first device in a set of devices;
   determining at least one capability for each device in the set, the at least one capability of the first device being different than the at least one capability of a second device in the set; and
   implementing the security policy on each device in the set by (i) accessing status information of the first device and the second device to determine which security mechanism each of the first device and the second device is currently using, (ii) selecting at least one security setting for each device in the set based on the at least one capability that is determined for the respective device and the user input, the selected security setting specifying a first security mechanism for the first device and a different second security mechanism for the second device, and (iii) configuring each device in the set of devices to accommodate the at least one security setting selected for that device, including configuring the first device with the first security mechanism and the second device with the second security mechanism.

10. The non-transitory computer-readable medium of claim 9, wherein the instructions cause the processor to provide the user interface by enabling a user to configure the security policy.

11. The non-transitory computer-readable medium of claim 10, wherein the instructions cause the processor to provide the user interface to include a plurality of options for a security setting, including the at least one security option, wherein the plurality of options includes a first option for designating the first security mechanism, a second option for designating the second security mechanism, and a third option for designating a selected security mechanism suited for individual devices, and (ii) receiving user input of a selection of the third option for designating the selected security mechanism.

12. The non-transitory computer-readable medium of claim 9, wherein the instructions cause the processor to determine at least one capability of each device in the set by (i) determining a model of each of the first device and the second device, and (ii) determining a version information of firmware installed on each of the first device and the second device.

13. The non-transitory computer-readable medium of claim 12, wherein the instructions cause the processor to determine at least one capability for each device in the set by (i) determining, for each of the first device and the second device, which portion or field of a resource to access based on the model and a version information of that device, and (ii) retrieving, for each of the first device and the second device, support information from the portion or field of that resource.

14. The non-transitory computer-readable medium of claim 13, wherein the resource corresponds to a webpage.

15. The non-transitory computer-readable medium of claim 9, wherein the set of devices correspond to network-enabled printer devices, and wherein the instructions cause the processor to implement the security policy on each of the first device and the second device by communicating with the first device and the second device over a network.

16. The non-transitory computer-readable medium of claim 9, wherein the instructions cause the processor to periodically determine the security policy based on a preconfigured schedule.

17. A system comprising:
a network interface;
a memory storing a database about a plurality of network-enabled printers that can communicate with the system;
at least one processor coupled to the network interface and the memory, the at least one processor to execute instructions to:
provide a user interface to enable a user to specify input for selecting at least a security option for a first device in a set of devices;
determine at least one capability for each device in the set, the at least one capability of the first device being different than the at least one capability of a second device in the set; and
implement a security policy on each device in the set by (i) selecting, at least one security setting for each device in the set based on the at least one capability that is determined for the respective device and the user input, the selected security setting specifying, a first security mechanism for the first printer and a different second security mechanism for the second printer, and (ii) configuring each device in the set of devices to accommodate the at least one security setting selected for that device, including configuring the first printer with the first security mechanism and the second printer with the second security mechanism.

18. The system of claim 17, wherein the processor determines at least one capability of each device in the set by (i) determining a model of each of the first printer and the second printer from the database, and (ii) determining a version information of firmware installed on each of the first printer and the second printer from the database.

19. The system of claim 18, wherein the processor determines at least one capability of each device in the set by (i) determining, for each of the first printer and the second printer, which portion or field of a resource to access based on the model and a version information of that printer, and (ii) retrieving, for each of the first printer and the second printer, support information from the portion or field of that resource.

20. The system of claim 17, wherein the first security mechanism corresponds to an older mechanism as compared to the second security mechanism, wherein the first printer supports the first security mechanism but not the second security mechanism, and wherein the second printer supports both the first security mechanism and the second security mechanism.

* * * * *